Oct. 16, 1928.
J. C. BOYTON
1,687,750
CONDUIT CLAMP
Filed Nov. 21, 1923
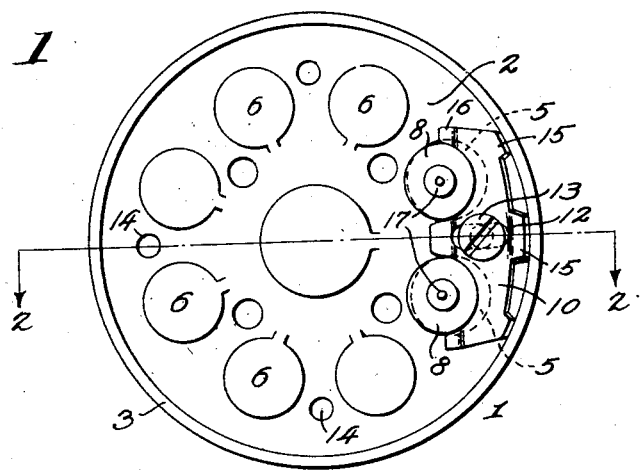
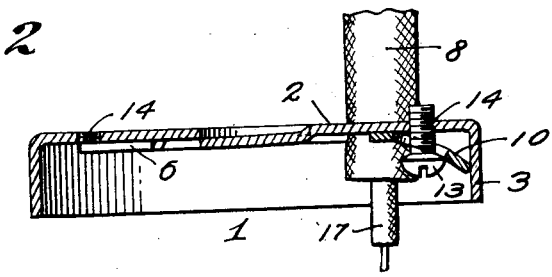
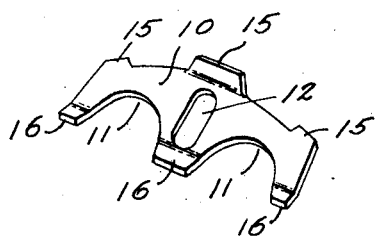
John C. Boyton, INVENTOR.
BY
Hull, Brock & West ATTORNEY.

Patented Oct. 16, 1928.

1,687,750

UNITED STATES PATENT OFFICE.

JOHN C. BOYTON, OF CLEVELAND, OHIO.

CONDUIT CLAMP.

Application filed November 21, 1923. Serial No. 675,991.

The purpose of this invention is to provide a very simple and inexpensive yet highly efficient means for clamping the end of a conduit, especally of the kind known as "loom", in an opening of an outlet box or receptacle used in the electrical wiring of a building or other structure, having in view also the convenience of installing the device and the ease of operating it.

The present preferred embodiment of the invention is illustrated in the accompanying drawing wherein Fig. 1 is a face view of an outlet box having conduits clamped within openings thereof by the improved clamping means of my invention; Fig. 2 is a section on the line 2—2 of Fig. 1; and Fig. 3 is a perspective view of the clamping plate.

The outlet box 1, which is of usual construction, is comprised of a circular wall 2 and a comparatively shallow peripheral wall 3. The design of the box is immaterial, the one shown being one of a popular size and style. The circular wall 2 is provided with a plurality of openings 5 which are closed until required for use by what are known as "knock-outs" 6.

According to the drawing two "knock-outs" have been removed to permit the insertion through a pair of the openings 5 of the ends of conduits 8 which are of a fibrous composition. This type of conduit is known to the trade as "loom". To securely bind the conduits within the openings 5 I employ a clamping plate 10, shown in perspective in Fig. 3. The clamping plate has notches 11 which receive the ends of the conduits. At its middle the clamping plate has a slot 12 through which a screw 13 is extended, the screw being threaded through one of a plurality of apertures 14 in the circular wall 2 of the outlet box. Parts designated 15 along the outer side of the clamping plate engage the inner side of the peripheral wall 3, while portions 16 along the inner side of the plate bear upon the circular wall 2. The parts 15 and 16 are preferably formed at a slight angle with respect to the body portion of the clamping plate so as to better fit the portions of the box wherewith they engage.

It is evident from the illustration that when the conduits 8 are projected through the holes 5 and the clamping plate 10 is drawn toward the wall 2 by the operation of the screw 13 the clamping plate, by reason of its engagement with the wall 3, will be forced laterally across the wall 2 in a direction to clamp between the edges of the notches 11 and the opposed edges of the apertures 5 the portions of the conduits which project between these parts. Wires 17 are led into the box through the conduits 8. Since the loom conduits are compressible, by tightening up sufficiently on the screw 13 the conduits may be contracted enough to firmly clamp the wires 17 within them. It is further pointed out that the clamping plate 10 serves to close the sides of the apertures 5 away from which the conduits are forced by the action of the plate.

Having thus described my invention, what I claim is:—

1. In a device of the character set forth, the combination of a receptacle having a wall provided with an opening through which a conduit is adapted to be extended, and a second wall disposed at substantially right angles to the first wall, a rigid clamping member arranged obliquely within the angle between, and with its opposed edges engaging, said walls, and means for advancing the member toward the first wall thereby to cause it by sliding contact with the second wall to be slid along the former wall and into clamping engagement with the conduit.

2. In a device of the character set forth, the combination with a receptacle having a wall provided with spaced openings through which conduits are adapted to be extended, and a second wall disposed at substantially right angles to the former wall, a rigid clamping member arranged obliquely within the angle between, and with its opposed edges engaging, said walls, the edge of said member adjacent the first wall having notches for the reception of the conduits, and means for advancing the member toward the first wall thereby to cause it by sliding contact with the second wall to be slid along the former wall and into clamping engagement with the conduit.

3. In a device of the character set forth the combination of a sheet metal outlet receptacle having a wall provided with spaced openings through which the ends of conduits are adapted to be projected and having also a wall disposed at right angles to the former wall, a sheet metal clamping plate designed to fit diagonally within the angle between said walls and having parts spaced along its opposite edges for sliding engagement with the respective walls, said plate having notches for the reception of the conduits and a transverse slot intermediate said notches, the first mentioned wall having a threaded hole in register with said slot, and a screw extending through said slot and threaded into said hole and the head thereof engages the clamping plate.

In testimony whereof, I hereunto affix my signature.

JOHN C. BOYTON.